United States Patent
Peevey

(10) Patent No.: US 7,043,459 B2
(45) Date of Patent: May 9, 2006

(54) METHOD AND APPARATUS FOR METERING ELECTRICITY USAGE AND ELECTRONICALLY PROVIDING INFORMATION ASSOCIATED THEREWITH

(75) Inventor: Michael R. Peevey, La Canada, CA (US)

(73) Assignee: Constellation Energy Group, Inc., Baltimore, MD (US)

( * ) Notice: Subject to any disclaimer, the term of this patent is extended or adjusted under 35 U.S.C. 154(b) by 0 days.

(21) Appl. No.: 09/206,782

(22) Filed: Dec. 7, 1998

(65) Prior Publication Data

US 2002/0091653 A1 Jul. 11, 2002

Related U.S. Application Data

(60) Provisional application No. 60/068,213, filed on Dec. 19, 1997.

(51) Int. Cl.
*G01R 21/00* (2006.01)
(52) U.S. Cl. ............... 705/412; 702/182; 702/61; 702/188; 340/870.02
(58) Field of Classification Search ........... 705/412, 705/34, 400, 413, 500, 1, 50; 702/182, 187, 702/188, 61, 62; 340/870.02
See application file for complete search history.

(56) References Cited

U.S. PATENT DOCUMENTS

| | | | |
|---|---|---|---|
| 4,120,031 A * | 10/1978 | Kincheloe et al. | 705/412 |
| 4,700,188 A * | 10/1987 | James | 340/870.03 |
| 5,311,581 A * | 5/1994 | Merriam et al. | 379/106.07 |
| 5,548,633 A * | 8/1996 | Kujawa et al. | 379/93.11 |
| 5,943,656 A * | 8/1999 | Crooks et al. | 705/1 |
| 6,122,603 A * | 9/2000 | Budike, Jr. | 705/412 |
| 6,161,100 A * | 12/2000 | Saar | 705/412 |
| 6,252,883 B1 * | 6/2001 | Schweickart et al. | 370/441 |
| 6,327,541 B1 * | 12/2001 | Pitchford et al. | 705/412 |
| 6,529,839 B1 * | 3/2003 | Uggerud et al. | 702/61 |
| 6,553,418 B1 * | 4/2003 | Collins et al. | 709/224 |
| 6,618,709 B1 * | 9/2003 | Sneeringer | 705/412 |

FOREIGN PATENT DOCUMENTS

WO WO 01/065823 A1 * 9/2001

OTHER PUBLICATIONS

Managing Service Usage Data for Strategic Advantage, A Service Provider's Guide, Hewlett-Packard, Internet Infrastructure Operation, Apr. 27, 1999.*
PowerRates Glossary, based on the California Energy Commission's Glossary of Energy Terms.

(Continued)

*Primary Examiner*—Pierre E. Elisca
*Assistant Examiner*—Cristina Owen Sherr
(74) *Attorney, Agent, or Firm*—R. Christopher Rueppell; Gregory M. Stone; Jeffrey C. Maynard

(57) ABSTRACT

A Metering Billing and Information Solutions ("MBIS") system for metering electricity usage and processing associated information includes an automated meter which electronically communicates metering information to a data processing system. The data processing system then appropriately calculates an electric bill using the metering information received from the meter. Additionally, the data processing system electronically stores the metering, billing, and other appropriate consumer account information. The MBIS system also includes an information system, which can be used by a consumer to remotely access the information stored by the data processing system. A payment system is also included in the MBIS system to facilitate electronic payment by a consumer.

6 Claims, 4 Drawing Sheets

OTHER PUBLICATIONS

New Energy Ventures, "At 12:01 A.M. Last Thursday, We Pulled the Plug on 100 Years of Electricity Monopolies", Product and Service Description Brochure.

New Energy Ventures, "Revolutionary Power Sweeps the Entire Nation", Product and Service Description Brochure.

Energy Information Administration, "Monthly Power Plant Electric Utility Sales and Revenue Report with Sales Distributions", "Annual Electric Utility Report", Federal Energy Regulatory Commission Cost and Quality Fuels for Electric Plants, pp. 1-3, Also available at www.eia.doe.gov/cneaf/electricity/esr/.

New Energy Ventures, "Customer Service Technical Billing Questions & Answers".

New Energy Ventures, LG&E Energy Corp., "Account Status", also available at www.lgeras.com.

New Energy Ventures, LG&E Energy Corp., "Billing Information", also available at www.lgeras.com.

New Energy Ventures, LG&E Energy Corp., "Bill in Progress", also available at www.lgeras.com.

New Energy Ventures, LG&E Energy Corp., "Daily Detail", also available at www.lgeras.com.

New Energy Ventures, LG&E Energy Corp., "Daily Usage Graph", also available at www.lgeras.com.

New Energy Ventures, LG&E Energy Corp., "Hourly Detail", also available at www.lgeras.com.

New Energy Ventures, LG&E Energy Corp., "Hourly Usage Graph", also available at www.lgeras.com.

New Energy Ventures, LG&E Energy Corp., "Estimated Bill Parameters" also available at www.lgeras.com.

New Energy Ventures, LG&E Energy Corp., "Estimated Bill", also available at www.lgeras.com.

New Energy Ventures, LG&E Energy Corp., "Statement History", also available at www.lgeras.com.

New Energy Ventures, LG&E Energy Corp., "Statement Summary", also available at www.lgeras.com.

New Energy Ventures, LG&E Energy Corp., "Make Payment", also available at www.lgeras.com.

New Energy Ventures, LG&E Energy Corp., "EFT Information", also available at www.lgeras.com.

New Energy Ventures, LG&E Energy Corp., "Reports and Graphs", also available at www.lgeras.com.

New Energy Ventures, LG&E Energy Corp., "Standard Reports", also available at www.lgeras.com.

New Energy Ventures, LG&E Energy Corp., "Questions and Comments", also available at www.lgeras.com.

New Energy Ventures, "Electronic Funds Transfer (EFT) Sign-Up", also available at www.lgeras.com.

* cited by examiner

METHOD AND APPARATUS FOR METERING ELECTRICITY USAGE AND ELECTRONICALLY PROVIDING INFORMATION ASSOCIATED THEREWITH

The present invention claims the benefit of U.S. Provisional Application No. 60/068,213, filed Dec. 19, 1997.

BACKGROUND OF THE INVENTION

1. Field of the Invention

The present invention generally relates to a method and apparatus for metering electricity usage and processing associated information. More particularly, the present invention relates to a method and apparatus for remotely metering electricity usage at consumer sites and for providing consumers with metering information, billing information, and electronic payment options.

2. Description of the Related Art

Electricity may be produced, transmitted, and distributed by an electric power system. Typically, at generating plants, a fuel source (e.g., fossil fuel, nuclear, falling water, and the like) is used to turn the rotor (i.e. rotating magnet) of a generator inside the stator (i.e. stationary coils of wire) of the generator to produce electricity. A transmission system and a distribution system then carry the generated electricity from the generating plants to homes, businesses, factories, and the like, where electricity is consumed. Power transformers may be used to: increase the voltage of the electricity prior to transmitting it on the transmission system from the generating plant; reduce the voltage of the electricity delivered from the transmission system to the distribution system; and connect together parts of the transmission and distribution systems which may operate at different voltages.

The transmission system for carrying electricity may include a vast network of transmission lines connected together to facilitate transmission of electricity across vast geographic distances. For example, in the United States, transmission lines are connected into one of three interconnected transmission grids. The Eastern grid includes transmission lines from the Eastern Seaboard of the United States to the Rocky Mountain states. The Western grid includes the Pacific Coast and Mountain states. The Texas grid operates entirely within that state.

As the various grids in the United States are interconnected, electricity can be generated in one area of the country and transmitted to another area of the country to ensure reliable electric service and more efficient use of electricity. For example, the demand for electricity during the summer months are typically higher in the southwestern region, such as in southern California and Arizona, than in the northwestern region, such as in Washington and Oregon. Consequently, electricity generated in states such as Washington and Oregon may be transmitted through the grids to higher demand states such as California and Arizona. In this manner, a wholesale (or bulk power) market has developed whereby electricity may be sold and purchased (or traded) through the grid before being sold to ultimate consumers.

For a century, the electric power industry in the United States has been highly regulated by federal, state, and local regulatory commissions. At the state level, public utility commissions have had regulatory authority over a variety of areas, including rates, accounting records, service standards, and service area conditions and boundaries.

At the federal level, the Federal Energy Regulatory Commission (FERC), an independent agency of the Department of Energy, has been responsible for regulating interstate electric rates and services. Additionally, the Nuclear Regulatory Commission (NRC) regulates the nuclear power industry, and the Environmental Protection Agency (EPA) grants permits for nearly all energy production facilities.

Due largely to the highly regulated nature of the industry, a small number of public agencies and privately owned companies known as electric utilities acting as virtual monopolies dominated the electric power industry. Investor (or Privately) Owned Utilities (IOUs) are private entities which are regulated by State and Federal government and earn a return for investors. Federally owned utilities, such as the Tennessee Value Authority (TVA), generate power but operate on a non-profit bases. Other utilities publicly owned by state and local government agencies also operate on a non-profit bases. Cooperatively owned utilities are owned by members (small rural farms and communities) and provide service mostly to members only.

Recently, however, a movement toward de-regulation of the electric power industry is providing tremendous entrepreneurial opportunities to delivery energy to consumers in new and innovative ways. Consequently, an ever increasing number of energy consumers are being provided with unprecedented opportunities to reduce their energy costs. Upstart energy firms, such as New Energy Ventures of Los Angeles, Calif., are providing power to energy consumers at rates lower than those generally available from local electric utilities by aggregating their consumer's energy buying power through an electricity buyers' consortium.

In addition to buying electricity at a lower rate, energy consumers may attempt to further reduce their energy costs by optimizing their energy consumption. Conventional methods of metering and billing electricity consumption, however, have many shortcomings which hinder the ability of consumers to optimize their energy purchasing and consumption decisions.

In one conventional method of metering and billing for electricity consumption, an electricity meter is manually read. An electricity meter is an electromagnetic device which measures the amount of energy transferred from the electricity supply to the consumer. Every few months, the electric meter is read by an inspector, or meter-reader, who goes to the consumer's meter and records the current reading. The old reading is subtracted from the current reading and the consumer is billed for the energy suppled for that period. A bill is then mailed to the consumer showing the amount of electricity used and amount due. This manual inspection of meters is labor and time intensive. Additionally, consumers are provided limited and untimely information as the electricity bill may be received by a consumer months after the actual costs have been incurred.

SUMMARY OF THE INVENTION

The present invention provides a method and apparatus for remotely metering electricity usage and for electronically providing consumers with metering, billing and payment information.

In accordance with an exemplary embodiment of the present invention, a Metering Billing and Information Solutions ("MBIS") system is provided. The MBIS system includes an automated meter which electronically communicates metering information to a data processing system. The data processing system then appropriately calculates an electric bill using the metering information received from the meter. Additionally, the data processing system electronically stores the metering, billing, and other appropriate consumer account information.

The MBIS system also includes an information system, which can be used by a consumer to remotely access the information stored by the data processing system. A payment system is also included in the MBIS system to facilitate electronic payment by a consumer.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

DETAILED DESCRIPTION OF THE INVENTION

Figure 1:
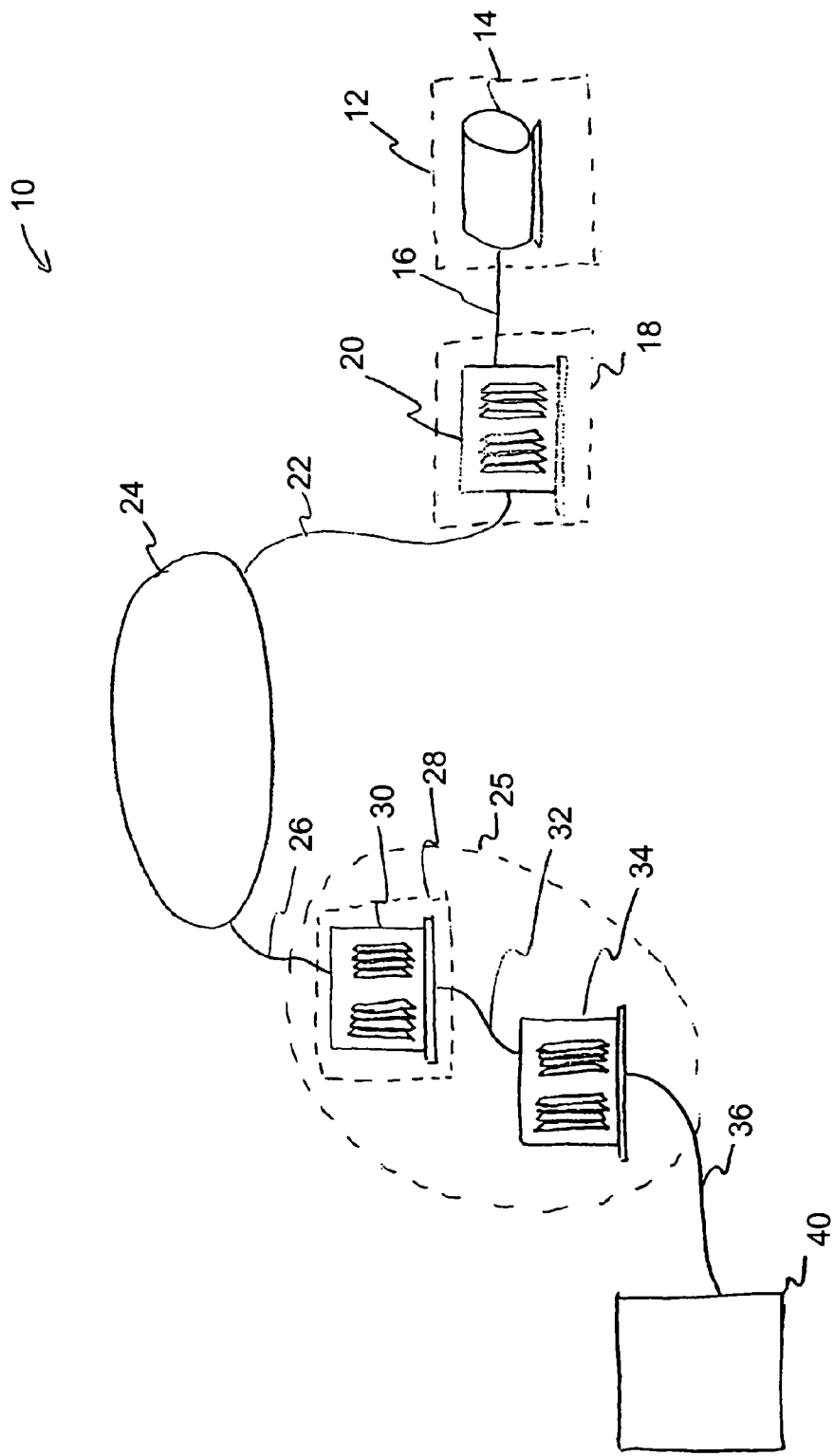
FIG. 1 is a schematic representation of an exemplary prior art electric power system.

With reference to FIG. 1, an exemplary electric power system 10 is shown. In power system 10, electricity is suitably generated at generating plant 12, transmitted through transmission system 24, and consumed at consumer site 40.

More particularly, electric power is suitably produced by generator 14 at generating plant 12. Generator 14 preferably includes a rotor (i.e. rotating magnet) which turns inside a stator (i.e. stationary coils of wire) to generate a flow of electrical current through the stator. A suitable fuel source (e.g., fossil fuel, nuclear, falling water, and the like) is appropriately used to turn the rotor of generator 14 to produce electricity. Alternatively, nonconventional methods of generating electricity can be used, such as photoelectric cells which convert solar energy into electricity.

Electricity produced at generating plant 12 is suitably transmitted to substation 18 on transmission line 16 formed from suitable conductive material such as copper, aluminum, gold, and the like. Transformer 20 located in substation 18 appropriately increases the voltage level of the electricity similar to the manner in which a water pump increases the pressure of water in a hose. The voltage level appropriately depends on the distance the electricity must travel and the amount of electricity desired. Typically, the voltage level preferably can range between about 69,000 volts to about 765,000 volts.

Generating plant 12 and substation 18 can include any number of generators and transformers, respectively. Substation 18 can be connected to any number of generating plants; or conversely, generating plant 12 can be connected to any number of substations. Additionally, although generator 14 and transformer 20 are depicted in separate locations (i.e. generating plant 12 and substation 18, respectively), any number of generators and transformers can be located in the same physical location.

After the voltage of the electricity is appropriately increased, transmission line 22 carries the electricity into transmission system 24. Transmission system 24 can include a grid (or network) of transmission lines to carry electricity from one point in the system to another. Substations (not shown) within transmission system 24 suitably increase or decrease the voltage level of the electricity to adjust for areas of the grid which operate at different voltage levels. Switching stations (not shown) within transmission system 24 suitably switch electricity between the transmission lines to carry electricity from one part of the grid to another. A central control center (not shown) suitably monitors and regulates the flow of electricity within the grid.

Distribution system 25 carries the electricity from transmission system 24 to consumer site 40. More particularly, distribution line 26 carries electricity from transmission system 24 to distribution substation 28. Step-down transformer 30 located in substation 28 suitably reduces the voltage level of the electricity. Next, distribution line 32 suitably carries electricity to local transformer 34, which further reduces the voltage level of the electricity. Finally, distribution line 36 carries electricity to consumer site 40 to supply electrical device 42 with electric power.

In general, the voltage level of the electricity is reduced from as high as 765,000 volts within transmission system 24 to about 120 volts at consumer site 40. Although only one step-down transformer 30 and local transformer 34 are depicted, any number of transformers in various configurations can be suitably employed to appropriately reduce the voltage level of electricity from transmission system 24 to consumer site 40.

Consumer site 40 may be associated with residential, commercial, industrial, and other end-users of electricity. Residential users may include private homes and apartment buildings, where electricity is consumed for space heating, water heating, air conditioning, lighting, refrigeration, cooking, clothes drying, and the like. Commercial users may include non-manufacturing businesses, such as hotels, motels, restaurants, wholesale businesses, retail stores, and health, social, and educational institutions. Industrial users may include manufacturing construction, mining, agriculture, fishing, and forestry establishments. Other users may include municipalities, divisions or agencies of State and Federal governments.

Figure 2:
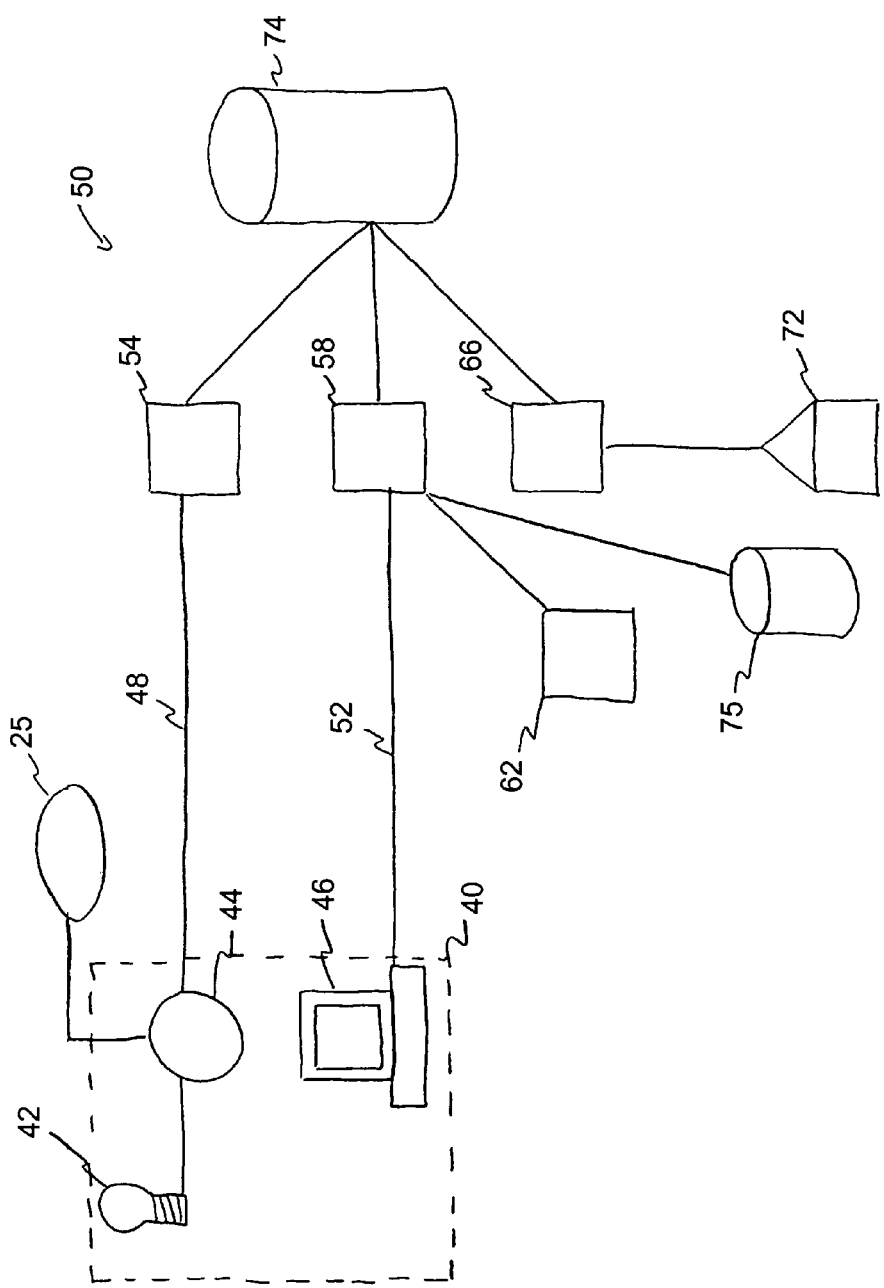
FIG. 2 is a schematic depiction of an exemplary MBIS system in accordance with the present invention.

Referring now to FIG. 2, an exemplary MBIS system 50 is shown. In order to provide a more thorough understanding of the present invention, the following description sets forth numerous specific details, such as specific process steps, process parameters, components, and the like. These specific details, however, need not be employed to practice the present invention.

In accordance with one aspect of the present invention, automated meter 44 is suitably installed at remote consumer site 40. Although one meter 44 and site 40 are depicted for simplicity, any number of automated meters can be installed at any number of consumer sites in accordance with the present invention.

Electricity is preferably carried by distribution line 36 from distribution system 25 to meter 44, which measures the amount of electricity consumed at site 40. More particularly, electric load 42 consumes electricity and preferably includes any number and type of electric devices. For example, for a home, load 42 may include electric appliances (e.g., electric refrigerator, oven, washer and dryer, and the like). For a business, load 42 may include electric office equipment (e.g., copier machines, computers, facsimile machines, and the like). For a factory, load 42 may include electric machines and tools (e.g., electric drills, saws, sanders, and the like). Additionally, load 42 may include lighting, heating and cooling systems for homes, businesses, factories, and other consumer sites.

Meter 44 preferably measures the amount of energy consumed in units known as kilowatt-hours. One kilowatt-hour is the amount of energy transferred when 1 kilowatt (1,000 watts) of power is used for 1 hour, which is equal to 3.6 MJ (3,600,000 joules). For example, if a 60-watt light bulb is turned on for 5 hours per day for 30 days, 60 watts of power is used for 150 hours, or 9 kilowatt-hours of electricity energy.

Meter 44 is preferably electronically connected to data processing system 54 by communication medium 48. Meter 44 communicates metering data, such as electricity usage data, to data processing system 54. In an exemplary embodiment of the present invention, meter 44 suitably provides metering data in real-time (i.e. continuously sending metering data or as requested by data processing system 54 or any other suitable requesting entity). Alternatively, metering data can be transmitted in batches either at predetermined times or when polled by data processing system 54.

Metering data electronically communicated by meter 44 also includes service and repair status of meter 44. For example, meter 44 can be appropriately configured to perform a self-diagnosis and send a periodic status to data processing system 54 indicating that it is functioning properly. When meter 44 fails to send the status, then data processing system 54 suitably issues a repair notice to have meter 44 serviced. Alternatively, meter 44 can be appropriately configured to send a notice to data processing system 54 when it detects a failure, then data processing system 54 suitably issues a repair notice to have meter 44 serviced.

Communication medium 48 preferably includes any suitable electronic communication medium (e.g., telephone links, leased lines, frame relay or synchronous transfer mode connections, local area networks, wide area networks, and the like). Alternatively, meter 44 and data processing system 54 can be connected through any combination of two or more data communication media. In an exemplary embodiment of the present invention, communication medium 48 is preferably available at all times to provide metering data in real-time. However, as described above, batch transmission at predetermined times or polling can be used in the alternative.

In an exemplary embodiment of the present invention, meter 44 preferably includes a modem suitably connected to electronic data lines. An automatic electricity meter configured with an integrated modem, such as the VECTRON™ meter (available from Schlumberger), can be used. Data processing system 54 periodically polls meter 44 automatically using a telephone line, such as a toll-free line. Alternatively, an operator may manually poll meter 44 when desired or necessary using data processing system 54.

In accordance with another aspect of the present invention, data processing system 54 suitably calculates a consumer's electricity bill using the metering data received from meter 44 and various price factors (e.g., generation cost of electricity; Independent System Operator ("ISO")/Power Exchange ("PX") charges for transmission, distribution and grid management; Utility Distribution Company ("UTC") charges for transmission, distribution, competitive transition charges ("CTC") and public goods; transactional charges for transaction services, including scheduling, procurement, meter reading and billing; Federal, state, municipal or other governmental subdivision taxes; and other appropriate charges and costs). Data processing system 54 suitably obtains the price factors from a database 75 which is preferably loaded and updated with the various costs and charges. Alternatively, the various costs and charges may be obtained from a third-party service provider.

Data processing system 54 suitably stores metering, billing, and other appropriate consumer account data (e.g., consumer name, address, profile, and the like) within database 74, which is preferably a graphical relational or object oriented database. Common database products that can be used include SQL Server (available from Microsoft Corporation of Redmond, Wash.), Oracle Database Server (available from the Oracle Corporation of Redwood Shores, Calif.), or Adaptive Server (available from the Sybase Corporation of Emeryville, Calif.). Alternatively, a plurality of database systems, including two or more combinations of database systems can be used in accordance with the present invention.

Data processing system 54 is preferably implemented by means of computer technology. For example, in an exemplary embodiment of the present invention, data processing system 54 may include computer software programs running on computer hardware equipment (e.g., workstations, servers, mainframe computers, and the like) configured with electronic communication devices (e.g., modems, network cards, and the like).

In accordance with yet another aspect of the present invention, information system 58 suitably provides access to metering, billing, and other suitable consumer data stored in database 74. Electronic-user interface 46 communicates electronically with information system 58 to obtain metering, billing, and other suitably consumer data. Interface 46 preferably includes a personal computer, a dedicated terminal, or other suitable device for accessing and viewing electronic data.

Interface 46 is suitably connected to information system 58 by communication medium 52 (e.g., telephone links, leased lines, frame relay or synchronous transfer mode connections, local area networks, wide area networks, and the like). Alternatively, interface 46 and information system 58 can be connected through any combination of two or more data communication media.

Figure 3:
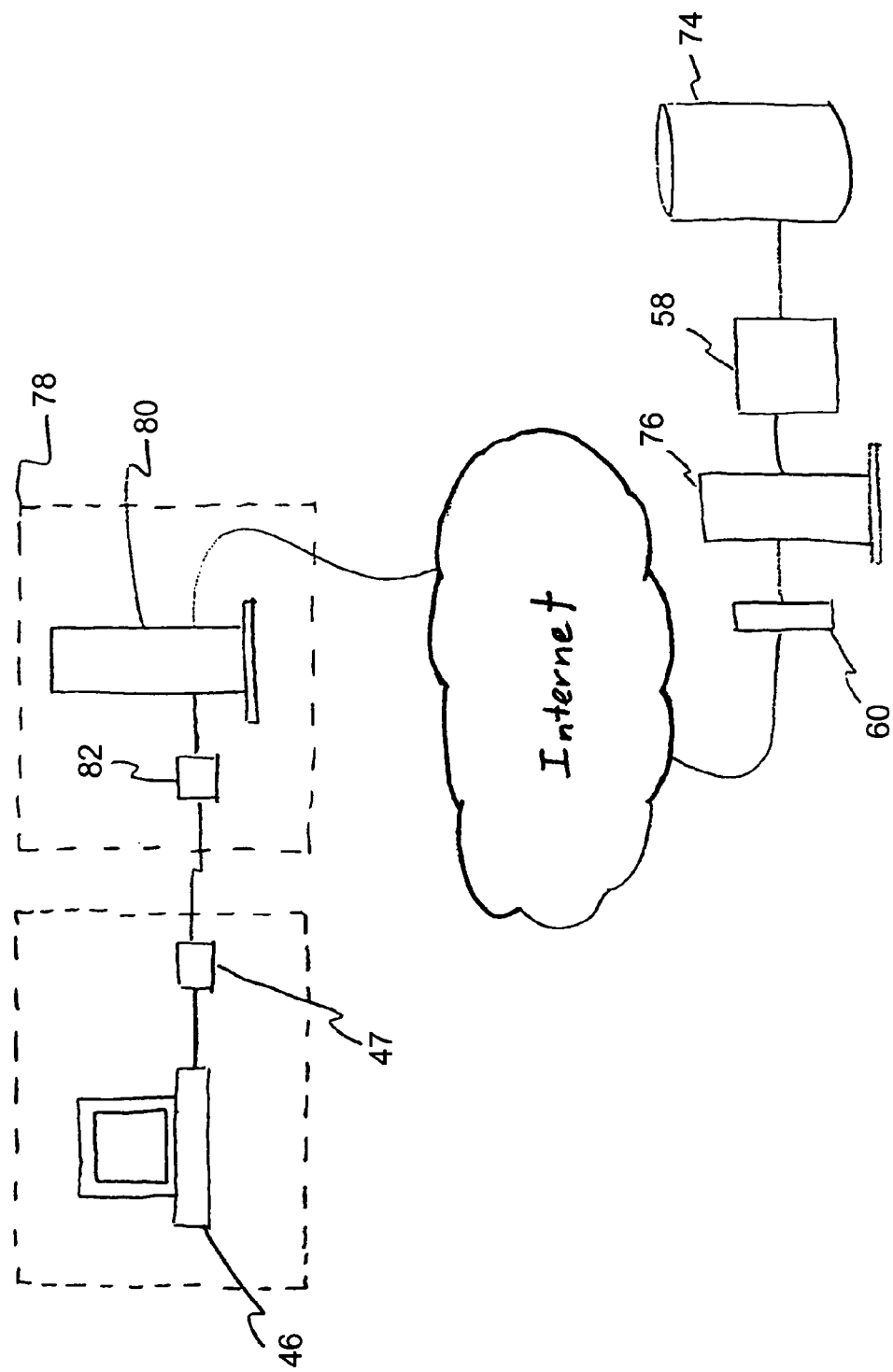
FIG. 3 is a schematic depiction of an Internet system which can be used with the MBIS system.

With reference to FIG. 3, in an exemplary embodiment of the present invention, communication medium 52 is preferably the Internet. Interface 46 preferably accesses the Internet through Internet service provider 78, such as MCI or America OnLine ("AOL"), using modems 47 and 82 to connect to host 80. Alternatively, interface 46 accesses the Internet through an Internet gateway or other suitable methods of accessing the Internet. Interface 46 preferably includes a suitable web browser, such as Microsoft Internet Explorer (available from Microsoft Corporation of Redmond, Wash.) or Netscape Navigator (available from Netscape Communications Corporation of Mountain View, Calif.).

Information system 58 preferably accesses the Internet through host 76. Security application 60, such as an Internet Firewall (a system designed to prevent unauthorized access to or from a private network), suitably prevents unauthorized and unwanted access to host 76 and more particularly to database 74. In an exemplary embodiment, security application 60 and information system 58 are preferably loaded on host 76. Host 76 preferably includes a server running Windows NT (available from Microsoft Corporation of Redmond, Wash.). Alternatively, security application 60 and information system 58 may be installed on separate terminals.

Figure 4:
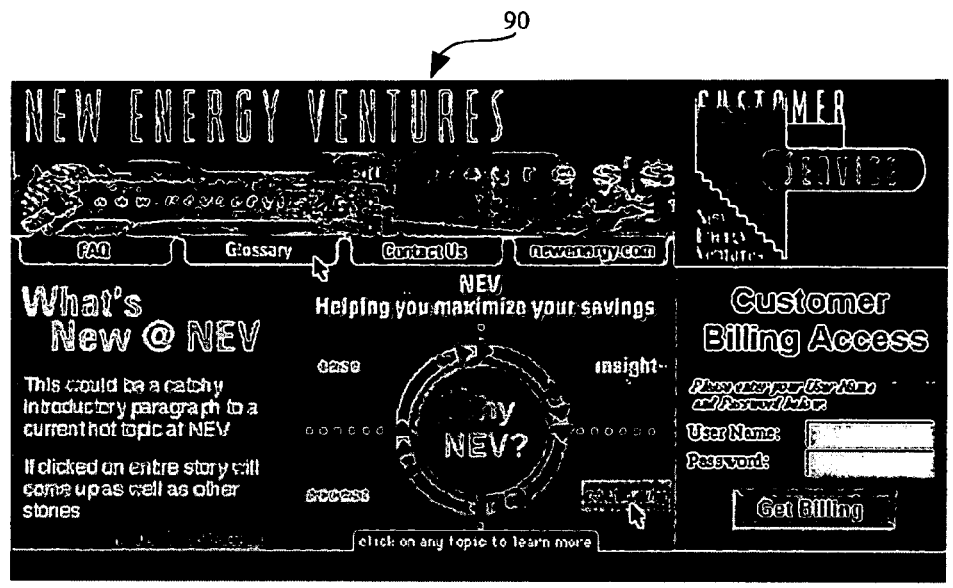
FIG. 4 is a representation of a exemplary home-page on the Internet configured to enable consumers to remotely access metering, billing and payment information.

Additionally, information system 58 is suitably configured to operate with a web site. For example, with additional reference to FIG. 4, web page 90 is preferably the home page of a web site on the Internet and the World Wide Web. A suitable Uniform Resource Locator (URL) is associated with web page 90 such as "http//www.nevservice.com" or any suitable URL. Accordingly, a consumer can access web page 90 by appropriately enter the URL associated with web page 90 on a suitable web browser. Web page 90 preferably requires a user name, or other suitable consumer identification, and a password, or other suitable security code, associated with the user name prior to permitting access to metering and billing data. In this manner, various security levels may be established to control the amount and nature of access permitted. For example, while various individuals at a company may be permitted to access the company's metering data, it may be highly desirable to limit access to billing data to only certain individuals, such as officers of the company.

Additionally communicated between a customer and the web site associated with information system 58 is preferably conducted using Secure Socket Layers (SSL) or other suitable encryption system.

Information system 58 suitably queries, retrieves and presents metering, billing and other suitable consumer data stored in database 74 in various formats depending upon the consumers requests and requirements. For example, consumers may be provided real-time data showing the electricity usage as it is communicated by their meter and the costs associated with the usage. Alternatively, consumers may be provided hourly usage data showing the electricity usage during hourly increments and associated costs. Additionally, consumers may be provided account information showing the amount owed and paid. Consumers also may be provided a detailed breakdown of their energy charges included various generation, transmission, and distribution charges (e.g., generation cost of electricity; Independent System Operator ("ISO")/Power Exchange ("PX") charges for transmission, distribution and grid management; Utility Distribution Company ("UTC") charges for transmission, distribution, competitive transition charges ("CTC") and public goods; transactional charges for transaction services, including scheduling, procurement, meter reading and billing; Federal, state, municipal or other governmental subdivision taxes; and other appropriate charges and costs). Further, consumer may be provided data in a variety of formats, such as tables, graphs, and the like.

In addition or in place of providing data electronically, information system 58 preferably includes report generator 62 for providing metering, billing, and other suitable consumer data in print. For example, a information system 58 preferably retrieves and compiles metering, billing, and other suitable consumer data, then generates reports containing the desired data. In this manner, a report containing data related to a particular customer can be generated and sent to a customer. Alternatively, reports may be generated for any number of purposes (e.g., quality control, market research, demographic analysis, and the like).

Information system 58 is preferably implemented by means of computer technology. For example, in an exemplary embodiment of the present invention, information system 58 may include computer software programs running on computer hardware equipment (e.g., workstations, servers, mainframe computers, and the like) configured with electronic communication devices (e.g., modems, network cards, and the like).

By having access to such data in a timely manner, consumers may be able to better manage their energy costs. For example, a manufacturing company may be able to adjust production to take advantage of lower electricity costs during different hours, days, weeks, or months. Alternatively, the manufacturing company may choose to purchase their electricity from a different source.

With reference again to FIG. 2, in accordance with yet another aspect of the present invention, payment system 66 suitably provides consumers with an option to make payment by electronic funds transfer, either directly or automatically. Consumers in advance provide bank account information and authorizations to withdraw funds from bank accounts. To make payment by electronic funds transfer directly, consumer direct payment system 66 to transfer funds each time the consumer desires to make payment by electronic funds transfer. Payment system 66 then communicates electronically with financial institution 72, such as a bank, using communication medium 170 to electronically transfer an appropriate amount of funds from an authorized bank account from financial institution 72. To make payment by electronic funds transfer automatically, consumers authorize payment system 70 to automatically transfer funds on a specific billing date. On the specified billing date, payment system 66 suitably communicates with financial institution 72 to electronically transfer an appropriate amount of funds from an authorized bank account. Payment system 72 then updates database 74 with regard to the electronic transfer of funds.

Payment system 66 is preferably implemented by means of computer technology. For example, in an exemplary embodiment of the present invention, payment system 66 may include computer software programs running on computer hardware equipment (e.g., workstations, servers, mainframe computers, and the like) configured with electronic communication devices (e.g., modems, network cards, and the like).

Metering and billing data processing system 54, information system 58, and payment system 66 may be implemented as a plurality of software programs installed on a distributed computing system suitably configured with a plurality of interconnected computers. Alternatively, data processing system 54, information system 58, and payment system 66 may be implemented as subroutines and sub-components of a single software program installed on a single computer, such as a network server, mainframe computer, and the like. Furthermore, data processing system 54, information system 58, and payment system 66 may be implemented as a combination of the previous implementations.

Although the present invention has been described thus far in the context of metering electricity, the present invention can be suitably used in conjunction with other utility meters (e.g., water, gas, and the like). For example, a water or gas meter is suitably configured to electronically communicate with metering and billing data processing system 54 to provide usage information. Data processing system 54 calculates the appropriate water or gas bill, then retains the usage and billing data in database 74. Information system 58 provides access to the water or gas usage and billing data stored in database 74. Similarly, payment system 66 provides consumers the option to pay their water or gas bill electronically. In this manner, consumers obtain usage and billing data relating to their electricity, water, gas, and other suitable utilities and make electronic payment from one source. Moreover, as described above, in accordance with various aspects of the present invention, consumers can obtain utility information and make payment using the Internet.

While a preferred embodiment of the present invention has been shown in the drawings and described above, it will be apparent to one skilled in the art that various embodiments of the present invention are possible; therefore, the present invention should not be construed as limited to the specific form shown and described above.

The invention claimed is:

1. A method for providing utility consumption data to a utility consumer over a network, the method comprising the steps of:
    receiving metering data and operational status information from a utility meter located at a remote facility operated by said utility customer, wherein said metering data is electronically and automatically transmitted over the network in substantially real time from said utility meter to a data processing system;
    calculating billing data using said metering data at said data processing system, wherein said calculating step calculates said billing data using:
    (a) generation costs,
    (b) transmission costs, and
    (c) distribution costs of said utility;
    storing said metering data and said billing data electronically at said data processing system; and
    reporting said metering data and said billing data electronically from said data processing system to said utility customer over the network, said reporting step including the steps of: providing a website on the network accessible by said utility customer; retrieving said metering data and said billing data from said database; and
    presenting said metering data and said billing data on said website; and
    allowing said consumer to affect electronic funds transfer via a payment system in accordance with said billing data.

2. The method in accordance with claim 1, wherein said receiving step further comprises the step of polling said meter using an electronic communication medium.

3. The method in accordance with claim 2, wherein said polling step polls said meter using a toll-free telephone line.

4. The method in accordance with claim 1, wherein said receiving step receives metering data from said meter wherein said meter is suitably configured with a modem for connecting to an electronic data line.

5. The method in accordance with claim 1, wherein said storing step stores said metering data and said billing data in a computer database.

6. A system for providing energy consumption data over a network for a facility affiliated with an energy consumer, the system comprising:
    a receiving means configured to receive, automatically, metering data in substantially real time, and operational status information, from a meter located at said facility via the network;
    a processing means in communication with said receiving means, wherein said processing means is configured to determine pricing options as a function of said metering information and of pricing factors affiliated with an energy source, wherein said pricing factors include generation costs, transmission costs, and distribution costs;
    a transmitting means configured to transmit said pricing options to said energy consumer via the network such that said energy consumer is allowed to evaluate said pricing options to thereby manage energy consumption at said facility, said transmitting means including a website hosted by said utility and accessible to the energy consumer over the network, wherein said website displays metering data and billing data associated wit the energy consumer such that said consumer may affect electronic funds transfer via a payment system in accordance with said billing data.

* * * * *